United States Patent [19]

Levine

[11] 4,236,813
[45] Dec. 2, 1980

[54] MULTIPLEX PHOTOCOPIER SYSTEM HAVING PLURAL SCANNERS WITHOUT MEMORY

[76] Inventor: Alfred B. Levine, 2924 Terrace Dr., Chevy Chase, Md. 20015

[21] Appl. No.: 39,107

[22] Filed: May 15, 1979

Related U.S. Application Data

[60] Continuation-in-part of Ser. No. 36,099, May 4, 1979, which is a division of Ser. No. 925,290, Jul. 17, 1978, which is a continuation-in-part of Ser. No. 775,480, Mar. 8, 1977, abandoned, which is a continuation of Ser. No. 718,260, Aug. 27, 1976, Pat. No. 4,182,568.

[51] Int. Cl.$^3$ ............................................. G03G 15/00
[52] U.S. Cl. .................................................. 355/14 R
[58] Field of Search ............ 355/14 R, 3 R; 358/300; 101/DIG. 13; 346/153, 160

[56] References Cited

U.S. PATENT DOCUMENTS 3,597,071  7/1971  Jones .................................. 355/3 R

*Primary Examiner*—R. L. Moses

[57] ABSTRACT

A multiplexed electrostatic copier having plural separated scan stations for randomly receiving and scanning documents to be copied, and a common developing mechanism for electrostatically making copies of the scanned images, and identifying and delivering the copies to the proper user. Provision is made for sequential operation by the different scan stations providing on-line operation of the first operated scan station and time delayed operation of the others to effectuate the multiplexing by the common developing mechanism without a memory of the images.

7 Claims, 6 Drawing Figures

MULTIPLEX PHOTOCOPIER SYSTEM HAVING PLURAL SCANNERS WITHOUT MEMORY

CO-PENDING APPLICATIONS

This application is a continuation-in-part of application Ser. No. 36,099, filed May 4, 1979, that is a division of Ser. No. 925,290, filed July 17, 1978, that, in turn, is a continuation-in-part of application Ser. No. 775,480, filed Mar. 8, 1977 [now abandoned], and which is, in turn, a continuation of Ser. No. 718,260 now U.S. Pat. No. 4,182,568 filed Aug. 27, 1976.

BACKGROUND OF THE INVENTION

FIELD OF INVENTION

This invention generally relates to electrostatic copiers, and more specifically to such copy machines having plural input optical scan stations for receiving images to be copied combined with a common developing and copy feed mechanism for making copies of the scanned images in a multiplexed fashion and selectively delivering the copies back to the correct station.

In the earliest patent application referred to above, Ser. No. 718,260, there is disclosed a multiplexed photocopier system having a number of independantly usable optical scanning stations that are combined, in a multiplexing fashion, with a lesser number of developing and paper feeding mechanisms, to more effectively provide additional copier capability, in a more efficient fashion, than conventional photocopiers having only one scan station for each machine. In one embodiment of this machine there is provided a video memory in the form of a magnetic tape, disc, or other, to selectively store and temporarily retain an optical image received from one of the scan stations during the time that the common development mechanism of the machine is cycling to produce a copy in response to an earlier operated scan station.

In other embodiments of such machines the common developing mechanism makes plural copies in response to operation of a plurality of scan stations, whether the different scan stations are operated in time sequence or simultaneously.

SUMMARY OF THE INVENTION

According to the present invention there is provided a multiplexed photocopy machine of this kind, that selectively interconnects a plurality of optical scanning stations to a lesser number of developing mechanisms, but that does so without the use of video memories for off-line storing of optical images.

According to one aspect of the present invention, there is provided lock-out circuitry for immediately or promptly connecting the first initiated scanning station to the developing mechanism in an on-line manner, and locking out the other stations until the first operated station has completed its function.

According to another aspect of the invention, there is provided a priority control circuitry to delay the operation of each scan station after it has been initiated, if it is not the first to be initiated, and to sequentially operate each of the later initiated stations in the same time sequence, or priority, in which they were turned "on" or initiated.

In a further aspect of the invention, each scanning station is provided with duplicate copy selector controls to permit the making of more than one duplicate copy. Such duplication controls are made part of the priority circuitry for enabling the duplicate copies to be made from any scan station prior to the next-in-order scan station being actuated.

In still further aspects of the invention, the common developing mechanism may be made to accomodate more than one optical image during each developing cycle, as disclosed in said earlier application, whereby various combinations of simultaneous and sequential development of images from the different stations may be produced.

DETAILED DESCRIPTION OF PREFERRED EMBODIMENTS

Figure 1:
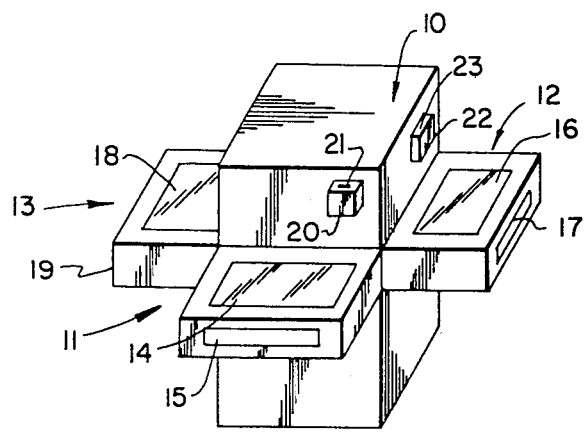
FIG. 1 is a perspective view depicting a multistation multiplexed photocopier as disclosed in said earlier application.

As shown in FIG. 1, the multiplexed electrostatic copier device as disclosed in the earlier application generally comprises a common central housing 10 having a plurality of separated optical scan stations 11, 12, and 13 supported by the common housing and so located and disposed with respect to one another that a plurality of different users can randomly make use of any one or more of the scan stations for making copies of documents, books, or objects without interfering with other users. In the disclosed arrangement of FIG. 1 the central housing is provided as a four sided rectangularly shaped structure 10, with each of the four outer flat walls supporting a projecting platform 11, 12, and 13, each adapted to receive the documents or objects to be optically copied on its upper surface 14, 16 and 18, respectively, and to deliver copies of the images reproduced through outlets or slots provided in each platform 15, 17 and 19, respectively, located at the front face of each scan platform and adjacent the copy area. Each of the scan stations 11, 12, and 13 operates completely independently of the other stations by different users and is accordingly provided with a separate actuating button and switch, or a coin operating switch located near each station. In the machine illustrated, scan station 11 is provided with its coin receptable and switch 20, having a slot 21 to receive coins or tokens to start or actuate the scanning mechanism for that station. Similarly, scan station 12 is provided with coin receptable 22 for independently actuating the optical scanning mechanism for this station. Upon actuation of any one or more of the scan stations, a common high speed electrostatic developing mechanism that may include one or more photoconducts within housing 10 functions to develop a copy of the second image from that station or stations, and to deliver that copy or copies to the outlet slot of that station where the master was scanned. It will be appreciated that the invention is not limited to a multiplexed copier having four scan stations, but machines having either a greater or lesser number of scan stations may be provided.

Figure 2:
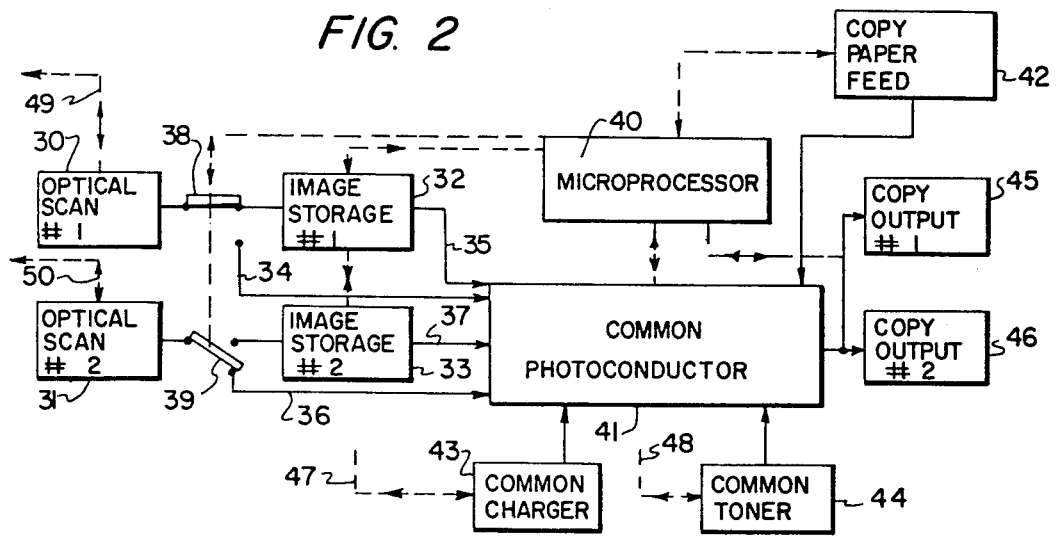
FIG. 2 is a schematic block diagram illustrating a multiplexing photocopier system employing video memory as disclosed in said earlier application.

FIG. 2 shows the multiplexing operating mechanism of this machine having two scan stations 30 and 31 for selectively feeding a common electrostatic copy developing mechanism, including a common photoconductor 41, in which the multiplexing operation of the machine is preferably controlled by a microprocessor 40. In this embodiment, the machine provides a direct or substantially immediate "on-line" development of the image in response to the actuation of either one of the scan stations 30 or 31, and an "off-line" or temporary storage of the image in a memory 32 or 33 of the image scanned by the second operated station in the event that the second scanning station is actuated before the development cycle is completed in response to the first actuated station. Following completion of the first cycle, the temporarily stored image, is then automatically applied to the common electrostatic development mechanism including photoconductor 41, to produce a copy corresponding to the second scanned image. By the use of a high speed electrostatic development apparatus, this "off-line" delay from the second station may be made sufficiently short in time so that the subsequent user may not even be aware of the fact that the machine is functioning in an off-line manner.

As previously disclosed, the two scan stations 30 and 31 are each selectively connectable over lines 34 and 36 to the common photoconductor 41 or to image storage means 32 and 33, respectively, for temporary storage of the scanned image. When one of the scan stations is directly connected to the common photoconductor 41, for on-line operation, the other scan station is automatically connected to its temporary image storage means for off-line operation. In a conventional manner, the common photoconductor drum, belt, disc, or the like 41 is first electrostatically charged by high voltage charger 43 prior to receiving the optical image to be developed. Following the application of the optical image from the scan station or the storage means, the latent electrostatic image is developed on the rotating photoconductor drum 41 by the application of liquid or powdered toner from the developer station 44. The developed or toned image is then transferred from the drum or web 41 to a sheet of copy paper supplied by the paper feed 42, and the copy sheet bearing the toned image is fused and conveyed to either of the outlets 45 or 46 corresponding to that scan station where that image originated. For automatically directing the copy sheet to the correct one of the separate outlets 45, 46, each copy sheet is provided with a simple coding that identifies that one of the scan stations where the image originated. This code is generated by the scan station itself that transmits a fixed identifying code signal from that station along with transmitting the optical image from the document to be copied. The station identifying code is applied directly to the photoconductor 41 at the margin of its image area (not shown) along with the image when that station is operating "on-line," and is developed and transferred to the copy sheet along with the image. When that station is operating "off-line," the code is temporarily stored along with the image and later applied to the common photoconductor 41 with the same result. For responding to the code, photocell detectors (not shown) are employed at the outlet, to recognize the code on each document and to divert that document to the proper one of outlet chutes 45 and 46 corresponding to the detected code.

Returning to FIG. 2, for a brief description of the functioning of the microprocessor 40 to provide the mode-of-operation described, each of the coin operated switches from the different stations 30 and 31 are connected over lines 49 and 50, respectively to the microprocessor 40 to initiate the different logical modes of operation. Upon actuation of a first one of those switches, such as line 50, the processor 40 connects scan station 31 over 39 and line 36 directly to the common photoconductor 41 for on-line operation and automatically interconnects the other station 30 over 38 to storge unit 32 in readiness for off-line operation in the event that the other scan station 30 is actuated during the development cycling of the machine in response to station 31. The image from station 31 directly applied to photoconductor 41, is developed by toner 44 and transferred to a copy sheet dispensed by paper feed 42. This sheet also bears the developed identifying codes (of dots or bars) at its margin, as previously described, whereby the completed copy is then correctly diverted to output 46 associated with scan station 31.

In the event that the other scanner 30 is actuated during the above developing cycle, its image is temporarily stored by magnetic tape recorder 32, and following completion of the previous developing cycle, the microprocessor 40 initiates readout of the image from storage 32 over line 35 to the photoconductor 41 to commence the next development cycle. Since the common electrostatic development process occurs at much higher speed than the time that the user manually expands at the optical scan station in placing the master to be copied in place, and inserting the coin or operating an actuate button, the multiplexing machine appears to operate almost instantaneously in response to all users, even where the machine employs four or more scan stations combined with a common electrostatic developer mechanism.

Each of the component sections of the machine including the scan stations 30 and 31, the storage units 32, and 33, the photoconductor 41, the paper feed 42, the charger 43, the developer or toner 44, and the conveyors and outlets 45 and 46 are all monitored, and the outputs of monitoring sensors are coupled to the microprocessor 40. In the event of a malfunction in any of the common components of the developing apparatus, the microprocessor 40 is preprogramed to shut off the entire machine by disconnecting the power. In the event of malfunction of apparatus associated with only one of the scan stations or storage, the microprocessor 40 functions to control the disconnect or disablement of only that portion. Each station may also be provided with a built-in indicator panel providing a number of fixed messages, such as "This section out of order—use one of the others," or "Machine disabled due to malfunction" or other. The proper message from such indicator is also preferably energized by a control signal from the microprocessor 40 concurrently when the disconnect function is performed.

In the event that two or more of the scan stations are actuated simultaneously, rather than sequentially as described above, the microprocessor 40 may be programmed to control the subsequent operation in either of two different modes-of-operation. For a "simultaneous" development mode, a plurality of scanned images can be simultaneously applied to different regions of a larger photoconductor drum or belt, as generally shown by scan stations 56 and 57 of FIG. 3, and the development of the plural images may be conducted during a single development cycle of the development apparatus. This mode is performed by the microprocessor 40 controlling each of the charger 43, toner 44, and paper feed 42, to operate twice, or more, during each cycle or rotation of the drum or belt, such that each latent image is properly charged and toned; and the toned or developed image is transferred to a separate copy sheet dispensed by the paper feeder. This simultaneous mode requires, of course, that each of these component parts be made in more complex and expensive form to provide the plural copy per cycle operation in response to simultaneous scan as well as the one copy per cycle normal mode-of-operation.

Alternatively, to simplify the machine and reduce its cost, the microprocessor 40 can be programmed in response to simultaneous actuation of two or more scan stations, to connect only one station for on-line operation and the others for off-line operation. Similarly if other stations (not shown in FIG. 2) are simultaneously actuated, the microprocessor 40 controls their on-line and off-line operation in a given predetermined order. The programming versatility of available microprocessors chips permits a considerable variety of different "logical" functions or selection to be preprogrammed into the chip that would easily include the above rather simplified modes as well as others.

Figure 3:
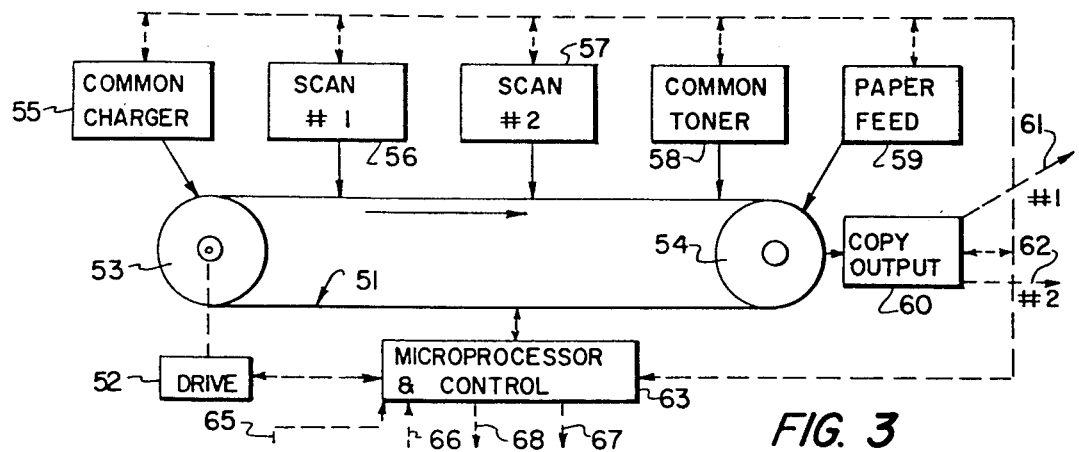
FIG. 3 is a schematic block diagram of a multiplexing photocopier system and showing simultaneous development of plural images as disclosed in said earlier application.

In FIG. 3, there is shown another embodiment of the invention wherein the machine always provides "simultaneous" or on-line operation for all scan stations regardless of their order of actuation or relative time of actuation. In a preferred mode of operation, particularly adapted for use when a relatively large number of scan stations are multiplexed to a common electrostatic developer, the photoconductor drum or belt 51 is driven continuously by motor drive 52, 53, and its surface is electrically charged for each cycle of rotation by high voltage charger 55. Each of the scan stations 56, 57, and others, are provided with light piping (not shown) or like optical means, for applying the scanned image from that station to a different displaced position with respect to the moving photoconductor 51, as is shown. Since the drum or belt 51 is constantly moving from left to right, a simultaneous actuation of scan stations, such as 56 and 57, operates to apply images to the charged photoconductor belt 51 at displaced positions, and both images are toned or developed in succession as the belt passes the common toner station 58. Continued movement of the belt 51 brings the toned images in sequence to the transfer station where the images are transferred to copy sheets from paper feed station 59 and finally directed at output 60 to the correct one of delivery chutes 61 or 62, as previously described. Thus, in this simultaneous mode of operation, the simultaneously actuation of plural scan stations functions to apply each of the latent images to displaced positions on the rotating drum or belt photoconductor 51 resulting in the development of all images in sequence, and the delivery of the copies during a single rotative cycle of the photoconductor. As described above each scan station also applies its identifying code at the border of its image on the photoconductor 51 enabling each developed copy to be properly conveyed and diverted into its correct outlet chute 61, 62 associated with its scan station.

In the event that the scan stations 56, 57 are actuated in sequence, however, the operation differs since the machine is required to insure that the optical images are not applied to the same location on the moving belt or drum 51 or in overlapped or partially overlapped positions (e.g. double exposure). This could occur, for example, should an earlier scan station 56 be actuated first to apply an image and as the exposed portion of the belt 51 passes the region of a later scan station 57, the later scan station 57 is actuated. To prevent this from happening, the microprocessor 63 monitors each scan station and records or "stores" in its memory the time of actuation of that station in response to closure of its actuating switch or operation of its coin operated switch. The microprocessor 63 additionally controls and monitors the operation of the conventional scanning motors (not shown) of each scan station, and accordingly it may briefly delay the commencement of an optical scan at ay particular scan station. Still further, the microprocessor 63 monitors and controls the speed of rotation of the photoconductor belt 51 or drum. Therefore, it may readily determine at the time of actuation of the start switch of any one of the scan stations whether or not the moving photoconductor belt 51 has an unexposed region available at that station to receive a latent image. In the event that a latent image or portion thereof is momentarily present on the moving belt 51 at the location of a particular scan station at its time of actuation, then the microprocessor 63 temporarily delays the commencement of optical scanning at that station until an unexposed region on the moving belt (or drum) is available to receive the scanned image. As previously mentioned, the preferred development mechanism employed is operated at high speed, and can accordingly produce copies at a rate much faster than the "manual" time required to feed master documents at any one of the stations. Accordingly the time delayed scanning as imposed by the microprocessor 63 at any one station to prevent overlapped images is so short in time as not to be noticeable by the user at that station. Thus, according to this mode-of-operation of FIG. 3, all of the different scan stations, such as 56 and 57, may be operated at random and independently of the others, and all apply their scanned optical images directly to a moving photoconductor 51 under the control of the microprocessor 63. The microprocessor 63, on the other hand, "remembers" the locations on the moving photoconductor 51 of each image as it is applied, so that it can determine by a simple logical operation whether a previous latent image exists on the photoconductor 51 at the location of a particular scan station at the time such scan station is actuated by a later user to commence scanning. In the event that such image or image portion does exist, the commencement of scanning at that station is momentarily delayed until an unexposed area of photoconductor becomes available whereupon the scan station is then enabled to commence its optical scan and apply the image to the moving photoconductor 51.

According to the present invention, there is provided a multiplexing system that functions in a manner similar to that described above in FIG. 2, but that does not require the use of video memories or storage means for temporarily retaining the video image from the station operating off-line. Additionally, according to the present invention there is provided a system of this kind that does not require plural images to be simultaneously developed as disclosed above in FIG. 3. On the other hand, the machine of the present invention may be combined in various ways with the systems of either, or both of FIGS. 2 or FIG. 3, as will be seen.

Figure 4:
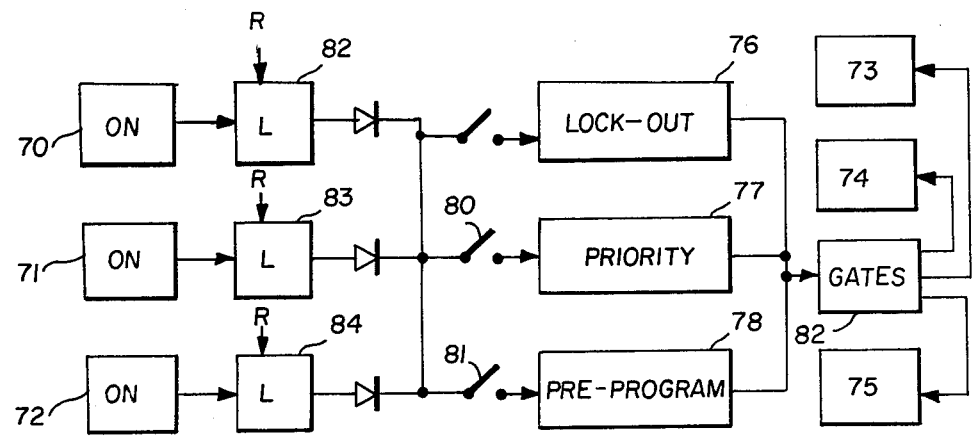
FIG. 4 is a schematic block diagram of the system controls according to the present invention.

According to one preferred systems embodiment of the present invention as generally shown in FIG. 4, the system generally includes a lock-out circuit 70 that prevents operation of more than one scan station at a time, or during each cycle; and a priority circuit 77 that keeps track of the time sequence of operation or initiation of each of the scan stations 70, 71, 72, [or others] and of the machine, to permit these scan stations to commence operation in the same priority or sequence in which they were initiated by the different users. The basic mode-of-operation of this embodiment is to momentarily delay in time the optical scanning of the document at each station following the users turning "on" of that station until its proper turn or priority of use, and then to automatically actuate that delayed scanner to rea the master document and develop a copy. Since the scanner mechanisms and the developer mechanisms operate at a much higher speed, or in a much shorter time, than the interval expended by the user in placing and removing the master document to be reproduced, the individual user is often unaware that his scan station has been so time delayed.

Thus, for example, if the "on" circuits 70, 71, and 72 for the three stations are initiated in the overlapping sequence of 70–71–72, the lock-out circuit 76 responds to the first operated switch 70, to lock-out or prevent operation of the second and third scanners [71,] yet immediately connects the first operated station 70 for on-line copying. When the first cycle has been completed and the copy for station 70 is made, the priority circuitry 77 resets the first initiated station 70 and interconnects the second initiated station 71 to scan its image and develop a copy thereof while maintaining the third station 72, locked-out until its turn.

In an alternative mode-of-operation, the priority circuitry 77 is disconnected at 80 and a preprogrammed circuit 78 is connected at 81. The function of the preprogram circuit is to always multiplex or sequence the different stations in the same order regardless of their relative times of initiation or starting. Thus, for example, the machine always operates in the sequence of station 70 to 71 to 72 and then repeats to 70 to 71 to 72 etc. Since the machine scans and reproduces so much faster than the human movements, any particular user is delayed for a very short interval, if at all.

Figure 5:
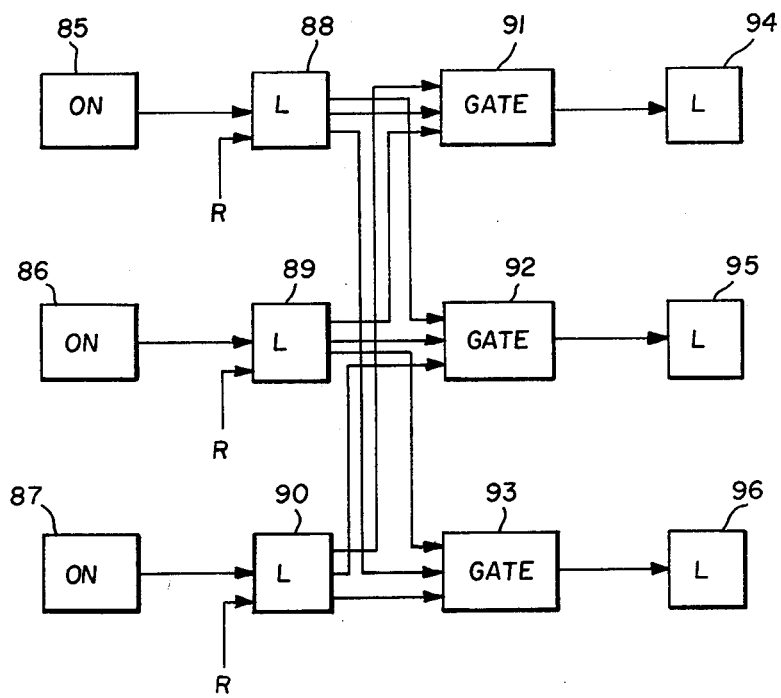
FIG. 5 is an electrical circuit block diagram showing details of the lock-out circuitry according to the present invention.
Figure 6:
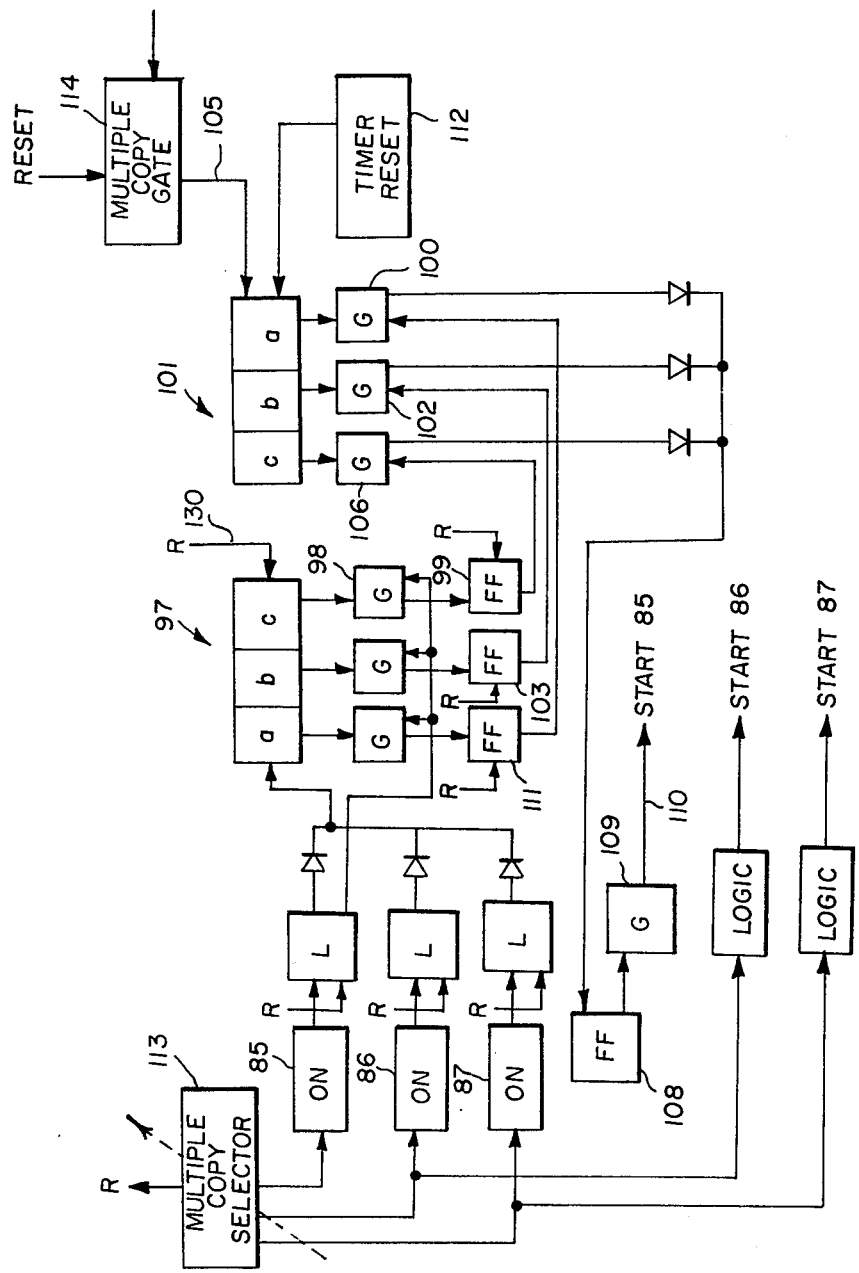
FIG. 6 is an electrical circuit block diagram partially showing priority circuitry according to the present invention.

Briefly recapitulating, all of the scan stations are interconnected in a lock-out and priority circuit, as shown in FIGS. 5 and 6, or in a preprogrammed circuit that serves to promptly initiate operation of the first operated scan station for printing or copying its image, but that time delays the printing from any other scan station in the event that one or more other station has been initiated earlier and the machine is cycling. The priority circuit 77 remembers the order or time sequence of initiation of each of the plural stations, and controls the time sequence of connecting each scan station for operation in the same order as it was initiated.

FIG. 5 shows further details of the lock-out circuitry for enabling prompt on-line operation or printing by the first initiated scan station. As shown, each of the initiating controls [e.g. coin operated push buttons] for the three stations 85, 86, 87 is connected to energize an associated latching circuit 88, 89, and 90 respectively, such as flip-flops, to change its state and remember when that switch has been operated by a user. Each of these latch circuits, in turn, is connected through a normally closed lock-out "OR" gate 91, 92, and 93 respectively, leading to an output control line or latch 94, 95, and 96, for the operational control of the scanner and machine in response to that scanner station.

Each of the normally closed gates 91, 92, and 93, for the individual scan stations are energized to "open and prevent a signal" in response to earlier actuation of the latch from either of the other scan stations, whereby whenever one of the scan stations is turned "on" first, it opens both of the other two gates thereby to "lock-out" or prevent the scanning and printing by both of the other two stations. As seen, this is performed by interconnecting the latching circuit 88 output from station 85 to both the gates 92 and 93 for scan stations 86 and 87, respectively. Similarly, each latch from each of the other two stations is connected to the two gates of the remaining stations to "lock-out" the remaining stations when either of those stations is operated. However, since all three gates 91, 92, and 93, are normally closed, the first station to be initiated by its "on" switch, sets its associated input latch to lock-out the other two stations and also directs a signal through its own normally closed gate to its output latch circuit so as to promptly commence scanning and printing of the image from that station. On the other hand, after the first "on" control from any one of the scan stations has been operated, the other two stations are temporarily locked-out and prevented from operating their output latches until such time that the "priority" circuit of FIG. 6, determines that it is the correct time for the scan station to function.

Referring to FIG. 6, the priority circuitry serves to "remember" the time sequence of initiation or turning "on" of each scan station with respect to the others and to temporarily prevent that station from operating until its proper turn or place in the time sequence [unless it is the first to operate]. For example, presuppose that the scan stations 85, 86, and 87 are turned "on" in overlapping time sequence and in the reverse order by three users. The first station 87 to be initiated, promptly commences its scanning function of the image at that station 87 without unnecessary delay, and thence the printing of that image; whereas the second station 86 to be initiated is locked-out and time delayed until the station 87 finishes, and the third operated station 85 is delayed still further until 86 finishes. When the first operated station 87 completes its cycling function, its latches [90 and 96—FIG. 5] are reset, and the priority circuit of FIG. 6 then automatically begins cycling of the second operated scan station 86 while keeping locked-out, the third operated station 8 until after the second station has completed its cycle and has been reset. The first operated station 87 is also "locked-out" after completing its cycle to prevent an additional independant operation until those others having higher priority have completed their scanning and copying functions.

Referring to FIG. 6 for an understanding of the priority circuit, there is provided a multistage counter 97 that is advanced to "remember" the number of scan stations that having been previously operated in overlapping time sequence, and for each scan station, there is provided a logic circuit that responds to both actuation of that station, and to the memory counter 97, to operate that scan station in its correct order or priority. In FIG. 6 is shown only the logic circuitry for upper scan station 85. It will be appreciated that the logic circuits for the other two scan stations will be the same as that disclosed for station 85.

Returning to FIG. 6, and recalling that in the above example, station 85 was the third station that was initiated or turned "on" in the sequence, the turning "on" of station 85 pulses the memory counter 97 to advance from its second stage 97b to third stage 97c, [signifying the lowest priority of three], and initiated station 85 also closes its input latch 88. The third "AND" gate 98 in the logic circuit is therefore energized by both the third counter stage 97c and also by setting of latch 88 whereupon it operates to set a third priority latch 99. In the meanwhile, the scanning by station 87 is then concluded, and upon its conclusion, a reset pulse is directed over line 105 to a reset counter 101 where it advances the counter 101 to its second stage 101b.

The second initiated scanning stage 86 is then automatically placed into operation to scan its image, to produce a copy; and upon its completion, to produce a reset pulse over line 105 to advance the reset counter 101 to its third stage 101c, indicating that the initially activated two of the scanning stations 87 and 86 having completed their cycles of operation. Upon advancing to the third reset counter stage 101c, the "AND" gate 106 is energized by the reset counter stage 101c. This "AND" gate 106 is also energized by the previously set latch 99, that has been previously set when the "on" switch for scan station 85 was initiated. As a result the "AND" gate 106 is now operated to pulse and to set the output latch 108 that, in turn, closes the normally open output gate 109 for scan station 85, to commence the operation of this scanning station and the making of a copy. Upon completion of the copying operation of this third initiated scan station 85, a reset pulse over 105 advances the reset counter 101 to its beginning or first stage 101a, backspaces the memory counter 97 to its initial stage 97a, and also resets the priority latch 99 and the output latch 108 [both associated with scan station 85] thereby to reset that portion of the priority circuit associated with scan station 85. It will be appreciated that the logic circuit provides each of the scan stations with three "AND" gates [such as 98] and three latches, such as 99, 103, and 111, all associated with memory counter 97, as well as providing each scan station with three gates, like 100, 102, and 106, associated with reset counter 101.

Briefly recapitulating the logic operation discussed above, the memory counter 97 is successively advanced stage-by-stage upon each "on" initiation of any one of the scan station switches 85, 86, or 87 to effectively count the priority position of that station with respect to the other stations that have been initiated earlier. The closure of the "on" switch for any station selects that one of the three gates and latches associated with that station. Thus, for example, if the station is the second to be initiated, it selects the middle "AND" gate and the middle latch, associated with counter stage 97b. The reset counter 101 on the other hand is successively advanced in step-by-step fashion upon completion of each scanning cycle to count the total number of cycles of the machine. Therefore as the machine successively cycles and makes copies, the reset counter 101 ultimately reaches the stage or position that has been "remembered" by the latches set by memory counter 97 whereupon the selected one of its gates 100, or 102, or 106 is energized by both the previously set latch [e.g. 98 or other] and by the stage of reset counter 101 to activate the scan station.

After each operation of a scan station, the memory counter 97 is also backspaced or reversed by one stage by a reset pulse over line 130, to "remember" the remaining number of scan stations still awaiting operation and copy making. Therefore, in the above stated example, when all three scan stations have completed their cycles of operation in the correct sequence as they were initiated, both the memory counter 97 and reset counter 101 have been reset to their initial stages.

However, in the event that only two of the three scan stations were initiated, the reset counter 101 might normally count only two pulses to its third stage 101c after the machine has completed its operation and stopped. Accordingly a timer operated reset circuit 112 is also provided to fully reset counter 101 after the machine has ceased operation and remains in an off condition for a given period of time.

In the event that multiple duplicate copies are to be made by any one of the scan stations 85, 86, 87, a multiple copy selector circuit 113 is employed for each station to preset a counter according to the number of duplicate copies desired for each scan station. The multiple copy switch circuit 113 controls a gate 114 in the reset circuit, to prevent the application of reset pulses to the memory counter 97, and the reset counter 101, and the latches until the desired preset number of duplicate copies have been made as requested at each scan station. Therefore, the machine effectively recycles at each scan station before going on to the next station until the required number of copies have been made as determined by a preset counter in the multiple copy selector circuit 113.

It will be appreciated that although only three scan stations are shown in FIGS. 4, 5, and 6, this circuitry is not limited to that number but may be employed with a fewer or greater number of stations. Additionally, although the operation of the priority circuitry has been described in the mode of having all three stations being initiated in overlapping order or sequence and then having the machine cease operation awaiting the next command, it is apparent that the machine may be operated in a continual on-off manner or continuously without stopping. For example, since the memory counter 97 is backstepped after each operation and since the latches for each station are reset after that station completes its cycle, a next in line user may promptly initiate operation of the "on" switch 85 or 86 or 87 of any station after it is vocated by a previous user, and the new user is promptly assigned a priority position by circuit of FIG. 6.

In the event that the machine is switched to a fixed program mode of operation 78 of FIG. 4 instead of a priority mode as described above, the machine merely cycles from station-to-station in a fixed order, such as from station 70 to 71 to 72 and back to station 70 to repeat. In the event that the initiating switch for any one of these stations is not depressed to set its latch 82 or 83 or 84, respectively, that station is merely by-passed in the cycle and the machine goes to the next station. Since a high speed printer requires only a short, few second, interval to make a copy, the users are often unaware of a temporary delay in the making of their copy, as previously noted.

What is claimed is:

1. A randomly operable multiplexing electrostatic photocopier comprising:
a plurality of independently operable optical scanning stations, each adapted to randomly receive optically reproduceable images to be copied, a common electrostatic copying mechanism being selectively connectable to said scanning stations for reproducing said images, and logically operated control means for selectively interconnecting any one of said plurality of scanning stations to said common electrostatic copying mechanism when it is the first station to be initiated, and time delaying the interconnection of another one of said stations after it is initiated when it is not the first station to be initiated, said logic circuitry time delaying the interconnection of any station whereby the image therefrom is reproduced in the same order of priority as the order of initiating that station relative to the others.

2. In the multiplexing electrostatic photocopier of claim 1, said logically operated control means responsive to the actuation of the first initiated image scanning station to lock-out the other stations.

3. In the multiplexing photocopier of claim 1, said logically operated control means responsive to overlapping time actuation of plural scanning stations to control the common copier for reproducing the plural images in the same programmed timed sequence.

4. In the multiplexing photocopier of claim 1, said logically operated control means responsive to simultaneous initiation of operation of plural scanning stations for automatically interconnecting said plural stations for simultaneous connection to the common copier mechanism, and responsive to non-simultaneous but overlapping time initiation of plural scanning stations for interconnecting said stations to the common copying mechanism in the same order of priority as the various scan stations were initiated.

5. In the multiplexing photocopier of claim 1, said logically operated control means responsive to simultaneous initiation of plural scanning stations for automatically interconnecting said plural stations for simultaneous on-line operation to the common copier mechanism, responsive to non-simultaneous but overlapping initiation of plural scanning stations for interconnecting a first initiated station for on-line operation to the common copying mechanism and time delaying subsequent initiated stations for copying in the same order in which they were initiated, and means responsive to multiple copy selection from any station for producing the requested number of duplicate copies before proceeding to connect the next-in-order scanning station.

6. In the multiplexing photocopier of claim 1, said logically operated control means responsive to simultaneous actuation of plural scanning stations for automatically interconnecting one of said scanning stations to the common copying mechanism and other scanning stations for time delayed operation in a predetermined order of priority.

7. A multiplexing electrostatic photocopier comprising:

a plurality of independently operable scanning stations, each adapted to randomly receive optically reproduceable images to be copied, a common high speed electrostatic developing mechanism responsive to said plurality of scanning stations for producing copies of said images, and control means for multiplexing said common electrostatic developing mechanism with said plurality of stations to selectively respond to different ones of said stations in time sequence in a predetermined order.

* * * * *